United States Patent [19]
Landenberger

[11] 4,407,162
[45] Oct. 4, 1983

[54] CHAIN MOTION MEASURING DEVICE

[75] Inventor: Ulric Landenberger, Mt. Clemens, Mich.

[73] Assignee: General Motors Corporation, Detroit, Mich.

[21] Appl. No.: 358,345

[22] Filed: Mar. 15, 1982

[51] Int. Cl.³ .............................................. G01P 3/00
[52] U.S. Cl. ..................................... 73/527; 198/502; 474/85
[58] Field of Search ............... 73/527, 529; 198/502; 474/85, 100

[56] References Cited

U.S. PATENT DOCUMENTS 3,818,290  6/1974  Harper et al. ...................... 318/39

Primary Examiner—James J. Gill
Attorney, Agent, or Firm—R. L. Phillips

[57] ABSTRACT

A conveyor chain motion measuring device is disclosed using a double take-off drive from the conveyor chain to produce accurate measurement of the actual chain speed and travel for the entire length thereof regardless of chain link pitch variations.

3 Claims, 1 Drawing Figure

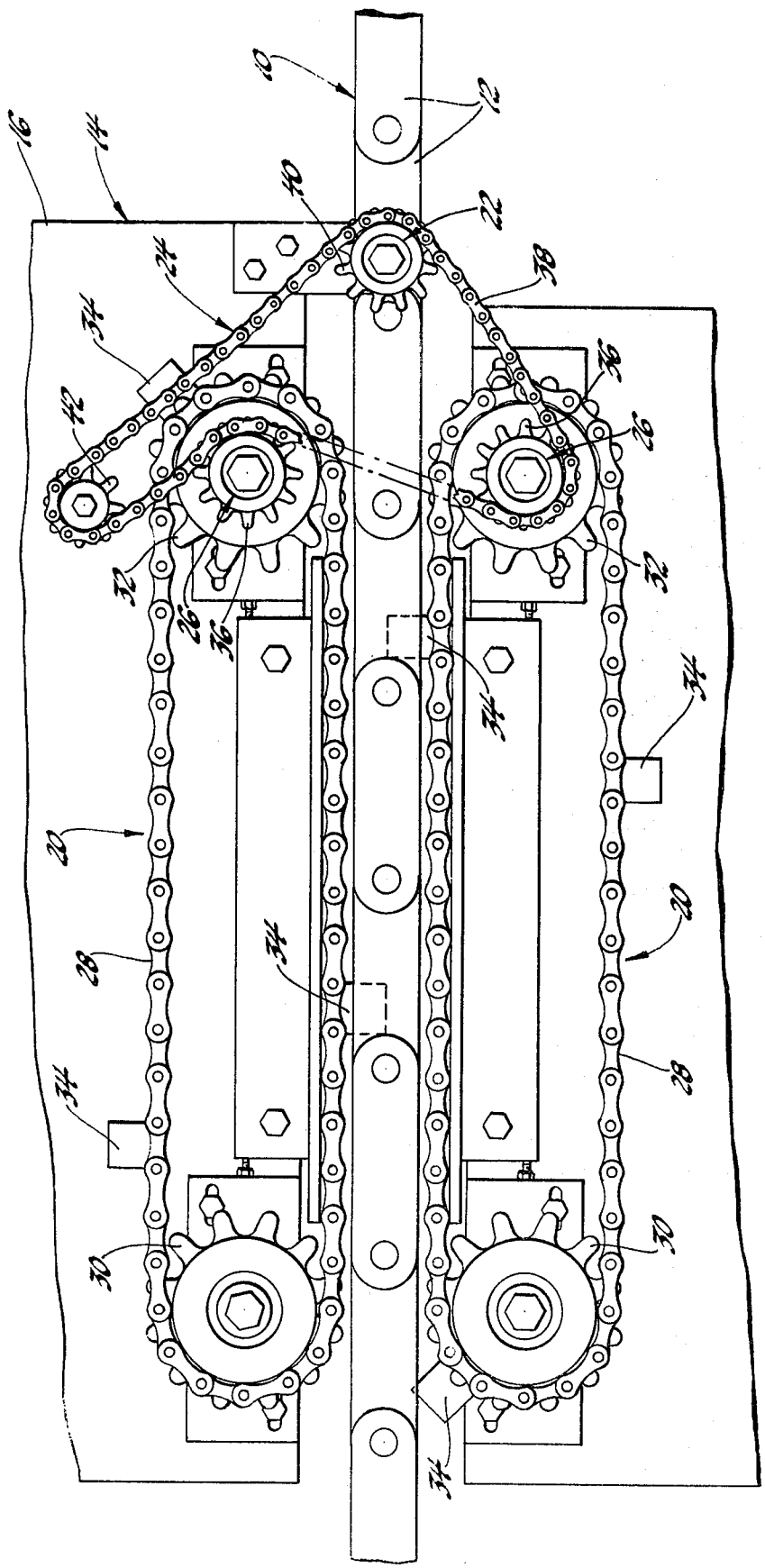

CHAIN MOTION MEASURING DEVICE

This invention relates to chain motion measuring devices and more particularly to a measuring device for precisely measuring the actual speed and travel of a chain.

Heretofore, the typical practice in measuring the motion of a chain such as used to drive an assembly line and the like to thereby measure assembly line speed and travel for monitoring thereof has been to use a measuring unit having a sprocket input directly engaged by the conveyor chain or to use a separate closed-loop drive chain which drives the measuring unit's sprocket and has lugs engaged by the conveyor chain. The former method measures the chain speed and travel by counting the chain link pitches and in practice the latter method becomes a pitch counter too. For example, in the latter method it is intended that several links on the measuring unit's drive chain will be engaged by the conveyor chain to maintain uninterrupted drive thereto but in actuality the measuring unit's drive chain is driven by a dominant conveyor chain link since the conveyor chain link pitches are not uniform. As a result, when the dominant conveyor chain link reaches the end of its engagement with the measuring units's drive chain the drive is transferred to another conveyor chain link and so on resulting in a lag in engagement or a jump ahead in the drive to the measuring unit. The conveyor chain links are, of course, designed to be equal; however, they are typically forged parts with broad tolerances that vary and accumulate errors. Moreover, conveyor chain wear also varies and new sections of chain may be added agravating the tolerances accumulated. As a result, both of the above prior methods are imprecise because they rely on the conveyor chain links to not only drive or input the measuring unit but also on the pitches of these links to measure the conveyor chain speed and travel. Such impreciseness is acceptable for many applications but is unacceptable for certain conveyor lines such as those that use robots which depend upon accurate measuring and monitoring of the actual speed and travel of the line to perform various programmed assembly line functions, e.g. painting vehicle body parts, manipulating parts and assemblies, etc.

The chain motion measuring device according to the present invention solves these shortcomings by eliminating tolerance accumulations or chain link pitch mismatches through use of the conveyor chain links only to drive the measuring unit while not relying on the chain link pitches for measurement. According to the present invention, there is provided a pair of closed-loop primary drives which are adapted to be engaged in staggered fashion and driven by the links of the conveyor chain so that one of the primary drives is always continuously fully engaged and driven by the conveyor chain without hesitation or jumping due to unequal conveyor chain link pitches. A separate closed-loop secondary drive is then provided which has uninterruptable drive to the measuring unit. Finally, there are provided separate overrunning drives for separately drivingly connecting the primary drives to the secondary drive which operate through relative overrunning operation to maintain a continuous drive thereto and thereby to the measuring unit from the conveyor chain through one or the other primary drives whereby the measuring unit is caused to give a true or accurate reading of the actual conveyor chain speed and travel at all times for the entire length of the conveyor chain regardless of chain link pitch variations.

These and other objects, advantages and features of the present invention will become more apparent from the following description and drawing in which the single FIGURE of the drawing is a side elevational view of the preferred embodiment of the chain motion measuring device according to the present invention as adapted to an automotive assembly line conveyor chain.

Referring to the drawing, there is shown a section of an automotive assembly line conveyor chain 10 comprised of interconnected links 12 which form a closed loop and are driven by a motor powered sprocket (not shown). A chain motion measuring device according to the present invention and generally designated as 14 is positioned along the conveyor chain 10 and is operable to accurately measure the actual speed and travel thereof and thus that of the assembly line which the conveyor chain drives. The chain motion measuring device 14 generally comprises a frame 16 on which are mounted (A) a pair of separate but identical closed-loop primary drive means 20 which are adapted to be engaged in staggered fashion and driven by the conveyor chain links 12, (B) measuring means 22, (C) closed-loop secondary drive means 24 for uninterruptedly driving the measuring means 22, and (D) a pair of separate but identical overrunning drive means 26 for separately drivingly connecting the two primary drive means 20 to the secondary drive means 24 so as to maintain a continuous drive thereto and thereby from the conveyor chain 10 to the measuring means 22.

Describing now the details, the two primary drive means 20 are located on opposite sides of the conveyor chain 10 and each comprise an endless or closed-loop chain 28 engaging a pair of spaced apart sprockets 30 and 32 which are rotatably mounted on the frame 16. The sprockets 30 and 32 are positioned so that the straight lengths of the chain 28 between its sprockets run parallel to the conveyor chain 10 and with one of the straight chain lengths adjacent thereto. Each of the primary drive chains 28 has three lug attachments 34 which are equally spaced along the length thereof and fixed thereto. The lug attachments 34 on one primary drive chain 28 are staggered with respect to those on the other primary drive chain so that the lugs on the two primary drive chains are alternately engaged by the links 12 of the conveyor chain 10 as shown. By this arrangement, at least one of the lug attachments 34 on one of the primary drive chains 28 is always fully engaged and being driven by the conveyor chain 10 without hesitations or jumps due to mismatched pitches in the conveyor chain.

The thus driven primary drive chain sprockets 32 are operably drivingly connected by the respective overrunning drive means 26 to drive identical sprockets 36 which are mounted coaxially therewith and form part of the closed-loop secondary drive means 24. In the closed-loop secondary drive means 24, the sprockets 36 engage the opposite sides of an endless or closed-loop drive chain 38 which extends across one side of the conveyor chain path and which in addition to engaging a sprocket 40 driving the measuring means 22 also engages a tensioning sprocket 42 that is rotatably mounted on the frame 16 and operates to always maintain tension in the chain 38.

In the preferred embodiment, the measuring means 22 is simply a conventional counting mechanism and the overrunning drive means 26 are simply conventional overrunning clutches.

With such arrangement and the conveyor chain 10 in motion, there will always be at least one of the lugs 34 on one of the primary drive chains 28 fully engaged by a conveyor chain link 12 with the result that one of the primary drive loops 20 is always driven by the conveyor chain 10 without hesitations or jumps due to nonuniform or mismatched pitches in the links 12 of the conveyor chain. The primary drive loops 20 in turn drive the secondary drive loop 24 through the overrunning clutches 26 which through relative overrunning operation act to accommodate engagement and disengagement fluctuations due to variations in the conveyor chain link pitch. For example, when there is a conveyor chain pitch variation, one of the primary drive loops 20 will dominate and drive the secondary drive loop 24 through its overrunning clutch 26 while the other primary drive loop is then in a momentary pause condition wherein its clutch drive to the secondary drive loop is overrun. Thus, there is maintained a continuous or uninterrupted drive from the conveyor chain 10 to the secondary drive loop 24 through the interaction of the two primary loops 20 at their overrunning clutches 26. Then in the secondary drive loop 24, the tensioning sprocket 42 maintains continuous tension in the chain 38 so as to maintain a continuous drive therein to the counter unit 22 which as a result, is caused to give a true reading of actual chain speed and travel at all times for the entire length of the chain regardless of conveyor chain link pitch variation.

While the measuring device's two primary drive loops 20 are shown as being on opposite sides of the conveyor chain 10, it will be appreciated that they may also be installed in tandem on one side of the conveyor chain. Moreover, it will be appreciated that the measuring device may be placed anywhere along the length of conveyor chain without affecting its accuracy.

The above described preferred embodiment is illustrative of the invention which may be modified within the scope of the appended claims.

The embodiments of the invention in which an exclusive property or privilege is claimed are defined as follows:

1. A chain motion measuring device for precisely measuring the actual speed and travel of a chain formed of interconnected links, said device comprising a pair of closed-loop primary drive means adapted to be engaged in staggered fashion and driven by the chain links whereby one of said primary drive means is always continuously fully engaged and driven by the chain without hesitation or jumping due to chain link pitch variation, measuring means for measuring speed and travel, closed-loop secondary drive means for uninterruptedly driving said measuring means, and separate overrunning drive means for separately drivingly connecting each of said primary drive means to said secondary drive means so that continuous drive is maintained from one of said primary drive means to said secondary drive means and thereby from the chain to said measuring means by operation of the overrunning drive means associated with said one primary drive means overrunning the other overrunning drive means when the other primary drive means becomes momentarily disengaged from the chain links because of chain link pitch variation whereby said measuring means is caused to give a true reading of actual chain speed and travel at all times regardless of chain link pitch variations.

2. A chain motion measuring device for precisely measuring the actual speed and travel of a chain formed of interconnected links, said device comprising a pair of closed-loop primary drive means adapted to be engaged in staggered fashion and driven by the chain links whereby one of said primary drive means is always continuously fully engaged and driven by the chain without hesitation or jumping due to chain link pitch variation, measuring means for measuring speed and travel, closed-loop secondary drive means including tensioning means maintaining continuous tension therein for uninterruptedly driving said measuring means, and separate overrunning drive means for separately drivingly connecting each of said primary drive means to said secondary drive means so that continuous drive is maintained from one of said primary drive means to said secondary drive means and thereby from the chain to said measuring means by operation of the overrunning drive means associated with said one primary drive means overrunning the other overrunning drive means when the other primary drive means becomes momentarily disengaged from the chain links because of chain link pitch variation whereby said measuring means is caused to give a true reading of actual chain speed and travel at all times regardless of chain link pitch variations, 3. A conveyor chain motion measuring device for precisely measuring the actual speed and travel of a conveyor chain formed of interconnected links, said device comprising a pair of closed-loop primary drive chain means adapted to be engaged in staggered fashion and driven by the conveyor chain links whereby one of said primary drive chain means is always continuously fully engaged and driven by the conveyor chain without hesitation or jumping due to conveyor chain link pitch variation, measuring means for measuring speed and travel, closed-loop secondary drive chain means including tensioning means maintaining continuous tension therein for uninterruptedly driving said measuring means, and separate overrunning clutch means for separately clutching each of said primary drive chain means to said secondary drive chain means so that continuous drive is maintained from one of said primary drive chain means to said secondary drive chain means and thereby from the conveyor chain to said measuring means by operation of the overrunning clutch means associated with said one primary drive chain means engaging and overrunning the other overrunning clutch means when the other primary drive chain means becomes momentarily disengaged from the conveyor chain links because of conveyor chain link pitch variation whereby said measuring means is caused to give a true reading of actual conveyor chain speed and travel at all times regardless of conveyor chain link pitch variations.

* * * * *